(12) United States Patent
Flores

(10) Patent No.: US 9,527,371 B2
(45) Date of Patent: Dec. 27, 2016

(54) CLIMB IN DESIGN DOORS

(71) Applicant: Ricardo Flores, Green River, WY (US)

(72) Inventor: Ricardo Flores, Green River, WY (US)

( * ) Notice: Subject to any disclaimer, the term of this patent is extended or adjusted under 35 U.S.C. 154(b) by 32 days.

(21) Appl. No.: 14/697,119

(22) Filed: Apr. 27, 2015

(65) Prior Publication Data

US 2016/0311296 A1  Oct. 27, 2016

(51) Int. Cl.
*B60J 5/04* (2006.01)
*B60R 3/00* (2006.01)

(52) U.S. Cl.
CPC ............. *B60J 5/0487* (2013.01); *B60J 5/0468* (2013.01); *B60J 5/0476* (2013.01); *B60R 3/00* (2013.01)

(58) Field of Classification Search
CPC ........... B60J 5/0487; B60J 5/0476; B60R 3/02
USPC ....... 296/190.03, 147, 148, 146.1; 280/164.1
See application file for complete search history.

(56) References Cited

U.S. PATENT DOCUMENTS

| | | | | |
|---|---|---|---|---|
| 2,682,427 A | * | 6/1954 | Bright | B60J 5/0487 135/117 |
| 4,070,056 A | * | 1/1978 | Hickman | B60J 5/0487 296/148 |
| 4,089,538 A | * | 5/1978 | Eastridge | B60R 3/02 182/77 |
| 4,556,125 A | * | 12/1985 | Johnson | B60R 3/02 182/91 |
| 5,046,582 A | * | 9/1991 | Albrecht | E06C 5/02 182/127 |
| 2002/0153718 A1 | * | 10/2002 | Schneider | B60J 5/042 280/748 |
| 2004/0061356 A1 | * | 4/2004 | Martini | B60J 5/0487 296/153 |
| 2010/0102528 A1 | * | 4/2010 | Stickles | B60R 3/02 280/163 |
| 2015/0014974 A1 | * | 1/2015 | Cotnoir | B60R 21/13 280/756 |
| 2015/0175114 A1 | * | 6/2015 | Schroeder | B60R 21/06 296/190.03 |

* cited by examiner

*Primary Examiner* — Jason S Morrow
(74) *Attorney, Agent, or Firm* — Christopher Pilling

(57) ABSTRACT

A tube door for off-road vehicles, including open recreational vehicles and Jeeps, is provided. It provides a ladder step for easy entry in and exit from the off-road vehicle. The tube door is hinged at its bottom portion for attaching to the bottom side of the door frame of the off-road vehicle. The tube door has a step bar, which provides a ladder step for the foot support for entry in or exit from the off-road vehicle when the tube door is in open position. The tube door has a lock system for keeping it in the closed position against the Jeep or open recreational/off-road vehicles. The tube door also provides a handle portion for holding when the tube door is in the closed position. The handle portion is the same portion that functions as the step portion when the tube door is in the open position.

11 Claims, 1 Drawing Sheet

CLIMB IN DESIGN DOORS

CROSS REFERENCE TO RELATED APPLICATIONS

Not applicable.

FEDERALLY SPONSORED RESEARCH AND DEVELOPMENT

Not applicable.

MICROFICHE APPENDIX

Not applicable.

BACKGROUND OF THE INVENTION (1) Field of Invention

The present invention generally relates to a tube door for off-road vehicles. More particularly, the present invention relates to a "tube door for off-road vehicles, including open recreational vehicles and sport utility vehicles, that is hinged at its bottom portion and a provides ladder for easy entry in and exit from the off-road vehicle".

(2) Background of Invention

Off-road vehicles, such as open recreational vehicles and sport utility vehicles, are designed for off-road use and bad road conditions. Hence, these vehicles are raised off of the ground farther than most vehicles, making it difficult to enter and exit these vehicles. The currently available solution for entry and exit of these vehicles is the side bar. Side bars often consist of a large diameter tubular bar that is bent into the appropriate shape and fastened to the vehicle chassis below the door. Side bars are bent into a general U-shape, with a long straight portion being positioned slightly below the passenger cab on the side of the vehicle. Two inwardly directed short legs extend underneath the vehicle, and are attached by bolting or welding to the vehicle chassis. The straight central portion extends the length of the passenger cab, and projects slightly to the outside of the vehicle. By extending slightly outward from the side of the vehicle, the side bars can act as a step to enter and exit the relatively high passenger cabs.

However, the side bar extending out of the vehicle body may cause issues if they strike something while driving the vehicle. Hence, it is desirable that a step for entering off-road vehicles, including open recreational vehicles and sport utility vehicles, be provided in an easily maintained fashion to prevent the instances of any collision of the step bar while driving the vehicle.

Nowadays, tube doors are also installed in sport utility vehicles to provide lightweight protection, on-trail visibility, and ventilation. These tube doors are attached to the sport utility vehicles on their side portion with the help of hinges to provide a swinging movement of the door. Currently, these doors only serve the primary function of protection.

Accordingly, there is a need for tube doors for off-road vehicles, including open recreational vehicles and sport utility vehicles, that can further provide support for easy entry in and exit from the vehicle, thereby making the requirement of the step bar redundant.

It is an aspect of the invention to overcome or alleviate a problem of the prior art.

This permits the use of the present invention, which enhances the prior art of the tube doors for off-road vehicles, including open recreational vehicles and sport utility vehicles, for providing support for easy entry in and exit from the off-road vehicle.

BRIEF SUMMARY OF THE INVENTION

In view of the foregoing, one aspect of the various disclosed embodiments of the present invention is to provide a tube door that is hinged at its bottom portion to the door frame of an off-road vehicle. This tube provides a step for easy entry in and exit from the off-road vehicle.

Preferably, the tube door for off-road vehicles addresses, or at least ameliorates, one or more of the problems described above. To this end, the present invention related to a tube door for off-road vehicles, with some unique aspects, is disclosed.

Accordingly, it is a primary objective of the present invention to provide a tube door for off-road vehicles. The tube door is hinged at its bottom portion for attaching to the bottom side of the door frame of the off-road vehicle. The tube door has a step bar, which provides a ladder step for foot support for entry in or exit from the off-road vehicle when the tube door is in the open position. The tube door of the present invention is useful for off-road vehicles, including open recreational vehicles and sport utility vehicles.

It is another objective of the present invention to provide a tube door for off-road vehicles that provides a handle portion for holding when the tube door is in the closed position. The handle portion is preferably the same portion that functions as step portion when the tube door is in the open position.

It is yet another objective of the present invention to provide a tube door that has a lock system for keeping it in the closed position against the off-road vehicle.

It is another objective of the present invention to provide a tube door for off-road vehicles that is made of metal, to provide strength.

Other objectives of the present invention will become apparent from time to time throughout the specification, as hereinafter related.

In this respect, before explaining at least one embodiment of the invention in detail, it is to be understood that the invention is not limited in its application to the details of construction and to the arrangements of the components set forth in the following description or illustrated in the drawings. The invention is capable of other embodiments, and of being practiced and carried out in various ways. Also, it is to be understood that the phraseology and terminology employed herein are for the purpose of description, and should not be regarded as limiting.

These, together with other objectives of the invention and the various features of novelty that characterize the invention, are pointed out with particularity in the disclosure. For a better understanding of the invention, its operating advantages, and the specific objectives attained by its uses, reference should be made to the accompanying drawings and descriptive matter, in which there are illustrated preferred embodiments of the invention.

BRIEF DESCRIPTION OF THE SEVERAL VIEWS OF THE DRAWINGS

To further clarify various aspects of some example embodiments of the present invention, a more particular description of the invention will be rendered by reference to specific embodiments thereof, which are illustrated in the appended drawing. It is appreciated that the drawing depicts only illustrated embodiments of the invention, and is, therefore, not to be considered limiting of its scope. The invention will be described and explained with additional specificity and detail through the use of the accompanying drawing, in which.

DETAILED DESCRIPTION OF THE INVENTION

The following detailed description of the present invention enables the teaching of the invention and its best, currently known embodiment. Those skilled in the art can understand that many changes can be made to the embodiments described, while still obtaining the beneficial results of the present invention. It will also be apparent that some of the desired benefits of the present invention can be obtained by selecting some of the features of the invention, while not utilizing other features. Accordingly, those working in the relevant art will recognize that many adaptations and modification to the present invention can be made and may be desired in certain circumstances, and are part of the present invention. Thus, the following description is provided as illustrative of the principle of the present invention.

Embodiments of the present invention provide a tube door for sport utility vehicles that provides a ladder for easy entry in and exit from the sport utility vehicles. The tube door also provides lightweight protection, on-trail visibility, and ventilation. The present invention has been described herein in respect to a sport utility vehicles. However, the inventive concepts described herein are applicable to any off-road vehicle, including open recreational vehicles and sport utility vehicles.

Embodiments of the method are shown in the figures and discussed below. It should be understood that the operations, as presented, are exemplary, and some operations may be substituted, added, rearranged, or removed while still encompassing the inventive subject matter. Moreover, it should be understood that the order of operations is not to be limited, unless explicitly specified herein.

Aspects of the present inventive subject matter are described with reference to the figures provided herein.

Figure 1:
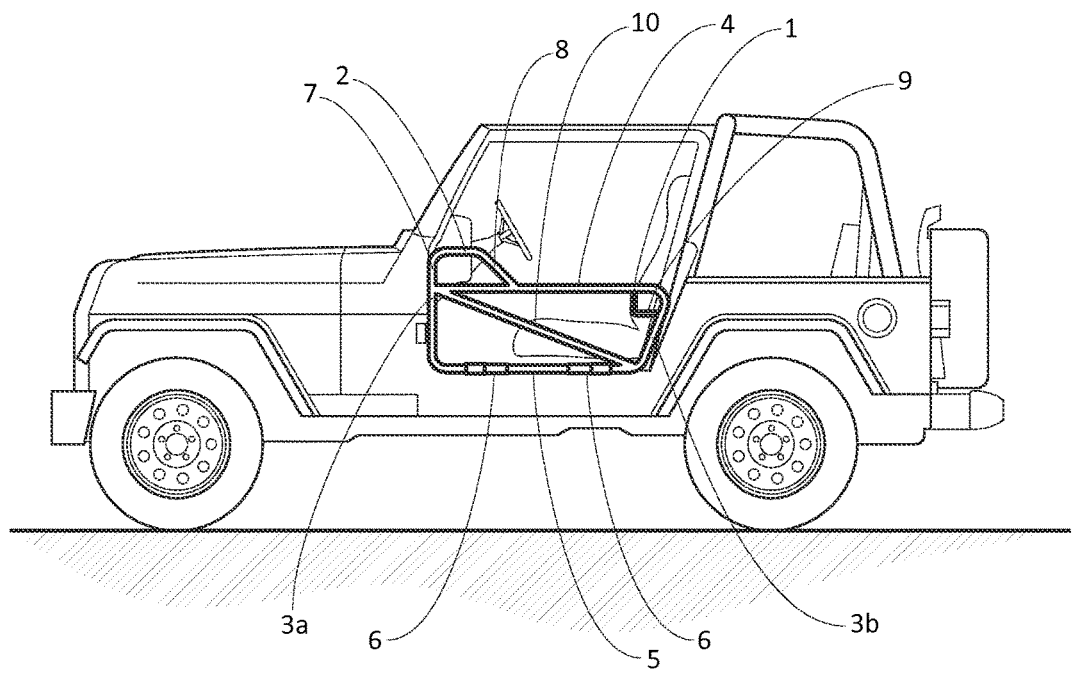
FIG. 1 is a perspective view of the tube door in the closed position in a sport utility vehicle, according to the preferred embodiment of the present invention.
Figure 2:
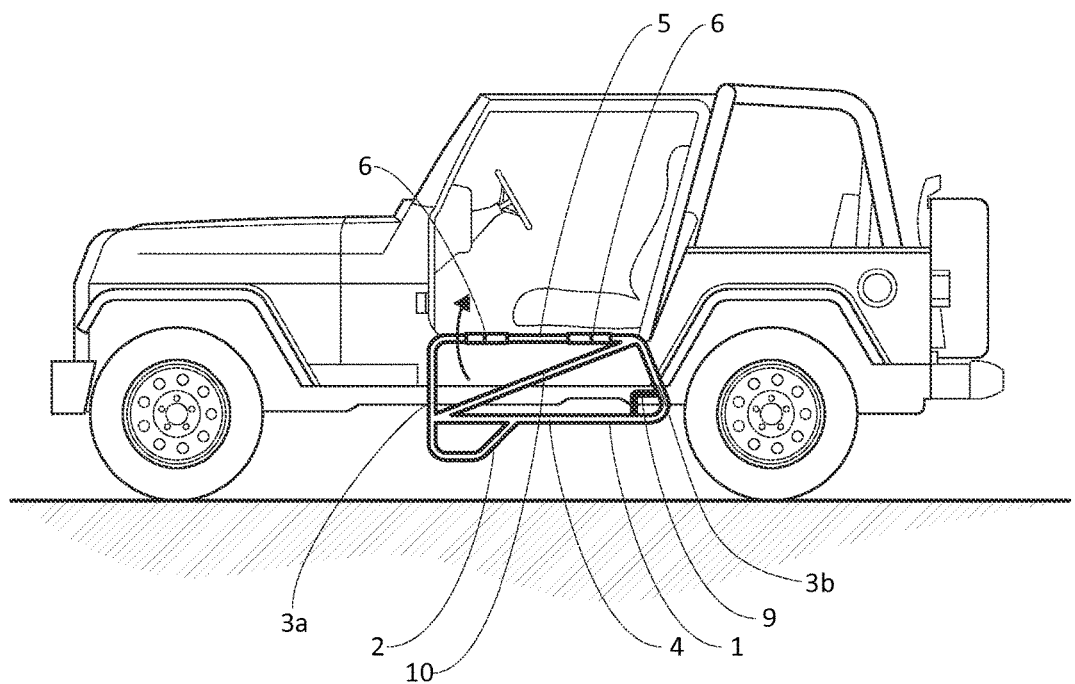
FIG. 2 is a perspective view of the tube door in the opened position in a sport utility vehicle, according to the preferred embodiment of the present invention.

The present invention provides a tube door for off-road vehicles with a ladder step for easy entry in and exit from the off-road vehicle, including open recreational vehicles and sport utility vehicles. FIGS. 1 and 2 depict a tube door of a typical sport utility vehicle. The tube door provides a ladder step for easy entry in and exit from the sport utility vehicle, according to one of the preferred embodiment of the present invention. The tube door can stay in the closed position, as it shown on FIG. 1, and the open position FIG. 2. The tube door is comprised of a main body 1 and a step bar 2. The main body is made of two straight side portions 3a and 3b, one straight top portion, 4 and one straight bottom portion 5. The main body is connected at its straight bottom portion to the bottom side of the door frame of the sport utility vehicle with the help of two hinges 6. The main body is so dimensioned to fit against the door frame of the sport utility vehicle. The step bar has a substantially straight portion 2 that is parallel to the straight upper portion 4 of the main body, and two bent portions 7 and 8. It is joined to the substantially straight portion 2 on their one end and joined to the straight upper portion 4 of the main body at their other end. The step bar is provided in the tube door to serve as a ladder step while climbing in and out of the sport utility vehicle when the tube door is in the open position. As shown in the figures, the tube door can be easily maintained in closed position with the help of a lock system 9. The lock system secures the tube door against the door frame of the sport utility vehicle. In a preferred embodiment, the lock system may be a spring latch. The tube door, due to its structure, also provides lightweight protection, on-trail visibility, and ventilation.

Again referring to the FIGS. 1 and 2 according to a preferred embodiment of the present invention, the main body of the tube door 10 may have a straight diagonal bar 10 with its upper end joining the corner of the straight upper portion of the main body of the tube door bearing the step bar and lower end joining the diagonally opposite corner of the straight bottom portion of the main body. The diagonal bar is provided in the tube door for added strength. According to another embodiment of the present invention, the main body of the tube door may have more bars for providing added strength to the tube door.

According to a preferred embodiment of the present invention, the tube door is made of steel. In another embodiment of the present invention, the tube door is made of 1 inch round steel. In still another embodiment of the present invention, the tube door is made of 1 inch round mild steel or chromoly steel, depending on the need for strength.

The tube door can be preferably manufactured with four pieces of metal bar. First, long metal can be bended at two places to form first bent portion of the step bar continuous in straight line with first straight side portion of the main body, then bended to form a straight bottom portion of the main body, and finally bended again to form the second straight side portion of the main body. Second, a metal bar forms the upper portion of the main body. Third, a metal bar forms the straight diagonal bar with its upper end joining the corner of the upper portion bearing the step bar and lower end joining the diagonally opposite corner of the bottom portion. Fourth, a smaller metal bar bended at one place forms the straight upper portion and second bent portion of the step bar.

According to a preferred embodiment, a person who wants to climb in the sport utility vehicle or open recreational/off-road vehicles may swing the tube door open, then use the step built in the tube door and climb into the heightened vehicle. Similarly, when the person wants to climb down the vehicle, he may swing the tube door open, then use the step built in the tube door and climb down the heightened vehicle. This provides easy entry in and exit from the vehicle. Furthermore, the step bar of the tube door also works as a handle when the tube door is in closed position. The handle can be held by the person sitting inside the vehicle for support.

It is to be understood that the above description is intended to be illustrative, and not restrictive. For example, the above discussed embodiments may be used in combination with each other. Many other embodiments will be apparent to those of skill in the art upon reviewing the above description.

Plural instances may be provided for components, operations, or structures described herein as a single instance. Finally, boundaries between various components, operations, and elements are somewhat arbitrary, and particular operations are illustrated in the context of specific illustrative configurations. Other allocations of functionality are envisioned, and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

I claim:

1. A tube door for an off-road vehicle that is comprised of:
   a main body that has two straight side portions;
   one straight top portion;
   one straight bottom portion;
   at least two hinges for connecting said straight bottom portion of said main body to the bottom side of a door frame of the off-road vehicle;
   a step bar having a substantially straight portion parallel to said straight upper portion of the main body;
   two bent portions joined to said substantially straight portion on one end and joined to said straight upper portion of said main body at other end;
   a straight diagonal bar; and
   a lock system for maintaining said tube door in closed position by securing said tube door against said door frame of said off-road vehicle
   wherein said main body is so dimensioned to fit against the door frame of said off-road vehicle;
   wherein said step bar serves as a ladder step for easy entry in and exit from the off-road vehicle, and as a handle for providing support to a person sitting in the off-road vehicle when said tube door is in closed position; and
   wherein said tube door provides on-trail visibility and ventilation.

2. The tube door of claim 1, wherein said lock system is a spring latch.

3. The tube door of claim 1, wherein said main body of said tube door having the straight diagonal bar with upper end of said straight diagonal bar joining a corner of the said straight upper portion of said main body bearing said step bar and lower end of said straight diagonal bar joining a diagonally opposite corner of said straight bottom portion of said main body.

4. The tube door of claim 1, wherein said diagonal bar providing strength to said tube door.

5. The tube door of claim 1, wherein said main body of said tube door has a plurality of bars for providing added strength to said tube door.

6. The tube door of claim 1, wherein said tube door is made up of steel.

7. The tube door of claim 1, wherein said tube door is made up of 1 inch round steel.

8. The tube door of claim 1, wherein said tube door is made up of 1 inch round mild steel or chromoly steel.

9. The tube door of claim 1, wherein the off-road vehicle is an open recreational vehicle.

10. A method of using tube door of claim 1 to climb in the off-road vehicle,
    said method comprising:
    swinging said tube door open;
    putting step on said step bar of said tube door;
    climbing up to said off-road vehicle; and
    bringing said tube door to an upright position.

11. A method of using tube door of claim 1 to climb down the off-road vehicle, said method comprising:
    swinging said tube door open;
    putting step on said step bar of said tube door; and
    stepping down from said off-road vehicle.

* * * * *